United States Patent
Jeong et al.

(10) Patent No.: US 8,218,956 B2
(45) Date of Patent: Jul. 10, 2012

(54) DRIVING SYSTEM AND HAND TREMOR COMPENSATING APPARATUS ADOPTING THE SAME

(75) Inventors: Hee-moon Jeong, Yongin-si (KR); Sung-hee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 970 days.

(21) Appl. No.: 12/107,101

(22) Filed: Apr. 22, 2008

(65) Prior Publication Data

US 2009/0179992 A1  Jul. 16, 2009

(30) Foreign Application Priority Data

Jan. 16, 2008  (KR) .................. 10-2008-0005003

(51) Int. Cl.
*G03B 17/00* (2006.01)
*G03B 7/04* (2006.01)
*H04N 5/228* (2006.01)

(52) U.S. Cl. ..... 396/55; 335/222; 335/296; 348/208.99; 348/208.2; 348/208.4; 348/208.7; 348/208.11

(58) Field of Classification Search .................. 335/222, 335/229, 296, 299; 359/199.3, 200.7, 202.1, 359/554–557; 396/55; 348/208.99, 208.2, 348/208.4, 208.7, 208.11
See application file for complete search history.

(56) References Cited

U.S. PATENT DOCUMENTS

2006/0269263 A1 * 11/2006 Kim et al. ................... 396/55
* cited by examiner

*Primary Examiner* — Ramon Barrera
(74) *Attorney, Agent, or Firm* — Sughrue Mion, PLLC (57) ABSTRACT

A driving system is provided. The driving system includes a fixed substrate, a coil unit which generates an electromagnetic force if an electric current applied, a magnet unit formed on the fixed substrate to face the coil unit, and a plurality of driving units which are interconnected with each other on the fixed substrate, and which are moved respectively in parallel direction with respect to a surface of the fixed substrate in accordance with an interaction between the electromagnetic force and a magnetic force of the magnet unit, if the electric current is applied. As a result, a non-contact driving is provided.

32 Claims, 7 Drawing Sheets

DRIVING SYSTEM AND HAND TREMOR COMPENSATING APPARATUS ADOPTING THE SAME

CROSS-REFERENCE TO RELATED APPLICATION

This application claims priority from Korean Patent Application No. 2008-0005003, filed Jan. 16, 2008, in the Korean Intellectual Property Office, the entire disclosure of which is hereby incorporated by reference.

BACKGROUND OF THE INVENTION

1. Field of the Invention

Systems and apparatuses consistent with the present invention relate to a driving system and a hand tremor compensating apparatus, and more particularly, to a driving system capable of non-contact driving using a coil and a permanent magnet, and a hand tremor compensating apparatus adopting the same.

2. Description of the Related Art

Images captured through devices such as digital cameras or camcorders are frequently influenced by the user's hand tremor. As the cameras and camcorders are made more compact-sized and light-weighted, the user's hand tremor poses still more problems. Therefore, the hand tremor is considered to be the biggest concern especially for those who have to take pictures while moving, and it has been increasingly demanded that this concern be effectively addressed to provide a good image quality.

One of conventional ways to compensate the hand tremor is a physical compensation of an optical axis, in which a photographing element is installed on a driving unit of a driving stage movable along a XY plane, and the driving unit is moved for the compensation of the displacement occurring due to hand tremor, to stabilize the absolute position of the photographing element.

The above conventional driving system uses a contact driving, such as a piezoelectric element, to use a friction with a driving axis. However, this system has problems such as a difficulty of maintaining an error within an allowable range in the contact area of the contacting units. For example, an abrasion on the contacting unit frequently causes malfunction and deteriorated reliability.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a driving system for providing a displacement using a magnetic force, and a hand tremor compensating apparatus adopting the same.

According to an aspect of the present invention, there is provided a driving system, including a fixed substrate, a coil unit which generates an electromagnetic force if an electric current applied, a magnet unit formed on the fixed substrate to face the coil unit, and a plurality of driving units which are interconnected with each other on the fixed substrate, and which are moved respectively in parallel direction with respect to a surface of the fixed substrate in accordance with an interaction between the electromagnetic force and a magnetic force of the magnet unit, if the electric current is applied.

The plurality of driving units include a first driving unit movable in a first direction which is parallel to the surface of the fixed substrate, and a second driving unit connected to the first driving unit to be moved in accordance with the movement of the first driving unit, the second driving unit movable in a second direction which is parallel to the surface of the fixed substrate and perpendicular to the first direction.

The driving system may further include a first spring unit to connect the first driving unit and the fixed substrate, and a second spring unit to connect the first and second driving units with each other.

The fixed substrate comprises a groove area formed therein. The first driving unit is arranged in the groove area, at a predetermined distance apart from the surface of the fixed substrate, the first driving unit having a cavity formed therein. The second driving unit is arranged in an area of the cavity of the first driving unit.

The coil unit may include a first coil formed in the first driving unit, and a second coil formed in the second driving unit.

The driving system may further include a first detecting unit which faces the fixed substrate and the first driving unit to measure a displacement of the first driving unit, and a second detecting unit which faces the first driving unit and the second driving unit to measure a displacement of the second driving unit.

The first and second detecting units may each include a plurality of electrodes, to measure displacement using a variation of capacitance between the electrodes.

The first detecting unit may include a first detecting electrode connected to the first driving unit, a second detecting electrode connected to the fixed substrate, and a first electrode output unit connected to the second detecting electrode to output an electric potential of the second detecting electrode.

The second detecting electrode and the first electrode output unit are formed in the fixed substrate separately from each other, structurally and electrically.

The plurality of driving units may further include a first upper structure layer which is formed on an upper portion of the first driving unit, and which is electrically separated from the first detecting electrode, and a second upper structure layer which is formed on an upper portion of the second driving unit, and which is electrically connected to the first detecting electrode. The second detecting unit may include a third detecting electrode connected to the second upper structure layer, a fourth detecting electrode connected to the first upper structure layer, and a second electrode output unit connected to the fourth detecting electrode to output an electric potential of the fourth detecting electrode.

The second electrode output unit is implemented as an elastic connector to connect the first upper structure layer and the fixed substrate.

The elastic connector has a thickness so as not to exceed the thickness of the first upper structure layer.

The first and second driving units are formed on a first wafer. The first upper structure layer and the second upper structure layer are formed on the second wafer. The first and second wafers are bonded to each other, with having an insulating layer interposed therebetween.

The magnet unit may include a pair of permanent magnets for driving, which face the first and second coils respectively and which have opposite directions of magnetization.

The permanent magnets for driving may each include a protruding area, and may be arranged so that the protruding areas thereof face each other.

The driving system may further include a yoke to surround the magnet unit so that a ferromagnetic shielding structure is provided.

The driving system may further include a stopper to restrict at least one of the first and second driving units from moving in a perpendicular relation with respect to the surface of the fixed substrate.

According to an aspect of the present invention, there is provided a hand tremor compensating apparatus, including a displacement driving unit comprising a plurality of driving units to move in designated directions due to an interaction between an electromagnetic force and a magnetic force, if an electric current is applied, and a photographing unit mounted to the displacement driving unit to move in accordance with the movement of the plurality of driving units.

The displacement driving unit may include a fixed substrate, a coil unit to generate an electromagnetic force, if an electric current is applied, and a magnet unit formed on the fixed substrate to face the coil unit. The plurality of driving units are interconnected with each other on the fixed substrate, and are moved respectively in parallel direction with respect to a surface of the fixed substrate in accordance with an interaction between the electromagnetic force and a magnetic force of the magnet unit, if the electric current is applied.

The plurality of driving units may include a first driving unit movable in a first direction which is parallel to the surface of the fixed substrate, and a second driving unit connected to the first driving unit to be moved in accordance with the movement of the first driving unit, the second driving unit movable in a second direction which is parallel to the surface of the fixed substrate and perpendicular to the first direction.

The hand tremor compensating apparatus may further include a first spring unit to connect the first driving unit and the fixed substrate, and a second spring unit to connect the first and second driving units with each other.

The fixed substrate comprises a groove area formed therein. The first driving unit is arranged in the groove area, at a predetermined distance apart from the surface of the fixed substrate, the first driving unit having a cavity formed therein. The second driving unit is arranged in an area of the cavity of the first driving unit.

The coil unit may include a first coil formed in the first driving unit, and a second coil formed in the second driving unit.

The displacement driving unit includes a first detecting unit which faces the fixed substrate and the first driving unit to measure a displacement of the first driving unit, and a second detecting unit which faces the first driving unit and the second driving unit to measure a displacement of the second driving unit.

The first and second detecting units may each include a plurality of electrodes, to measure displacement using a variation of capacitance between the electrodes.

The first detecting unit may include a first detecting electrode connected to the first driving unit, a second detecting electrode connected to the fixed substrate, and a first electrode output unit connected to the second detecting electrode to output an electric potential of the second detecting electrode.

The second detecting electrode and the first electrode output unit are formed in the fixed substrate separately from each other, structurally and electrically.

The plurality of driving units may further include a first upper structure layer which is formed on an upper portion of the first driving unit, and which is electrically separated from the first detecting electrode, and a second upper structure layer which is formed on an upper portion of the second driving unit, and which is electrically connected to the first detecting electrode. The second detecting unit may include a third detecting electrode connected to the second upper structure layer, a fourth detecting electrode connected to the first upper structure layer, and a second electrode output unit connected to the fourth detecting electrode to output an electric potential of the fourth detecting electrode.

The second electrode output unit is implemented as an elastic connector to connect the first upper structure layer and the fixed substrate.

The elastic connector has a thickness so as not to exceed the thickness of the first upper structure layer.

The first and second driving units are formed on a first wafer. The first upper structure layer and the second upper structure layer are formed on the second wafer. The first and second wafers are bonded to each other, with having an insulating layer interposed therebetween.

The magnet unit may include a pair of permanent magnets for driving, which face the first and second coils respectively and which have opposite directions of magnetization.

The permanent magnets for driving may each include a protruding area, and may be arranged so that the protruding areas thereof face each other.

The hand tremor compensating apparatus may further include a yoke to surround the magnet unit so that a ferromagnetic shielding structure is provided.

The hand tremor compensating apparatus may further include a stopper to restrict at least one of the first and second driving units from moving in a perpendicular relation with respect to the surface of the fixed substrate.

The hand tremor compensating apparatus may further include a wiring portion to connect input and output electrode wirings of the photographing unit to the upper portion of the fixed substrate.

The wiring unit may include a wiring spring unit to connect the fixed substrate to the second driving unit, and wherein a wiring is formed on an upper portion of the wiring spring unit.

BRIEF DESCRIPTION OF THE DRAWINGS

The above and other aspects of the present invention will be more apparent from the following detailed description of exemplary embodiments with reference to the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
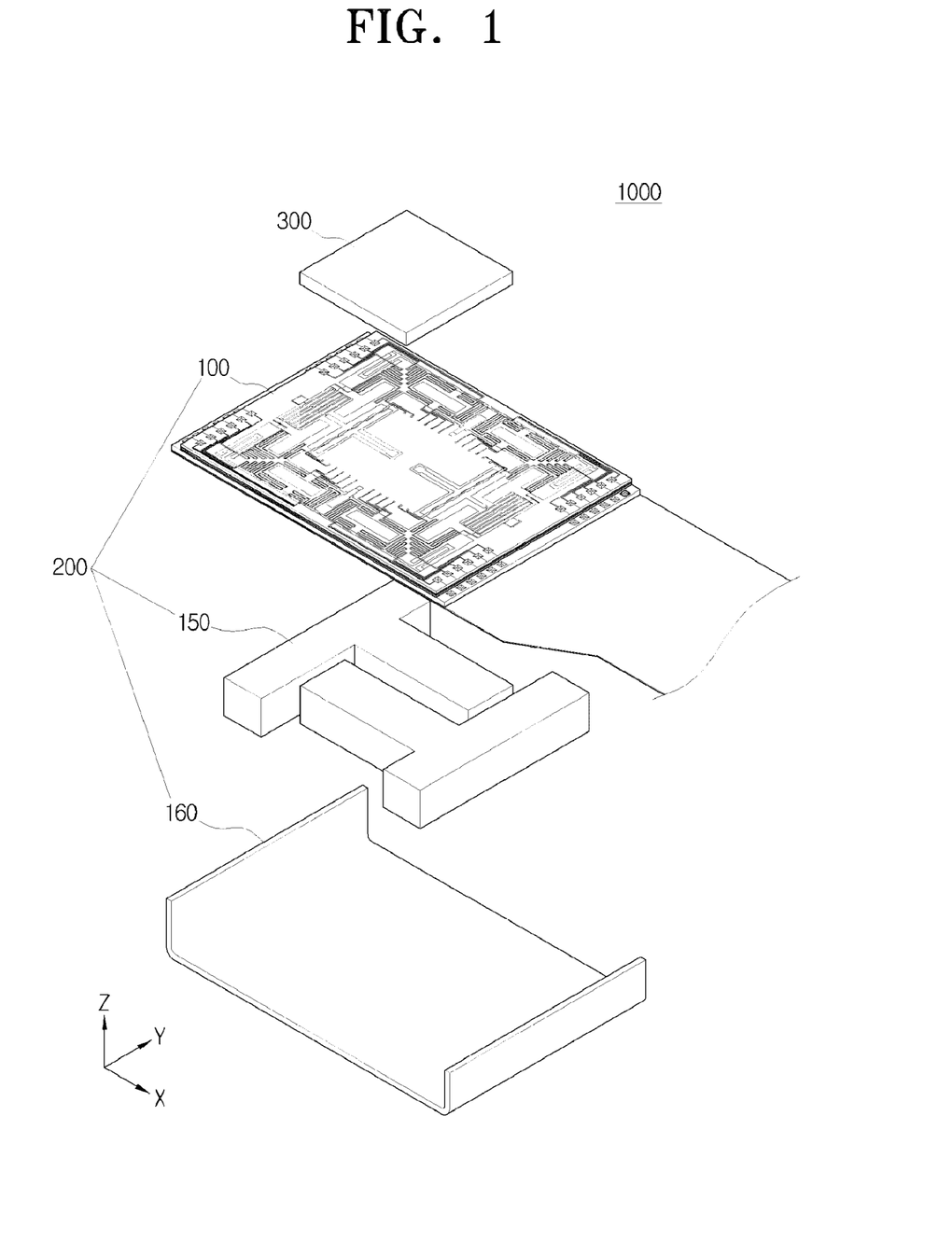
FIG. 1 is a perspective view illustrating a hand tremor compensating apparatus in disassembled state, according to an exemplary embodiment of the present invention.

FIG. 1 is a perspective view of a hand tremor compensating apparatus in disassembled state according to an exemplary embodiment of the present invention.

Referring to FIG. 1, the hand tremor compensating apparatus 1000 includes a displacement driving unit 200, and a photographing unit 300.

The displacement driving unit 200 includes a plurality of movable driving units to move in designated directions according to the interaction between electromagnetic and magnetic force occurring as the electric current is applied. Specifically, upon detecting a shake such as a hand tremor, a coil electric current corresponding to the tremor is applied, to cause the driving units to move by the Lorentz force generated according to the interaction between the applied electromagnetic force and the magnetic force of the permanent magnet.

The displacement driving unit 200 corresponds to a driving system in the embodiments of the present invention. The displacement driving unit 200 includes an XY driving stage 100, a magnet unit 150, and a yoke 160.

The XY driving stage 100 is movable in a horizontal, X-Y plane. The XY driving stage 100 may be implemented as a micro-electro-mechanical system (MEMS), and may include one or more driving units. Each driving unit is movable in X and Y directions. The XY driving stage 100 will be explained in further detail below with reference to FIGS. 2 to 4.

Figure 2:
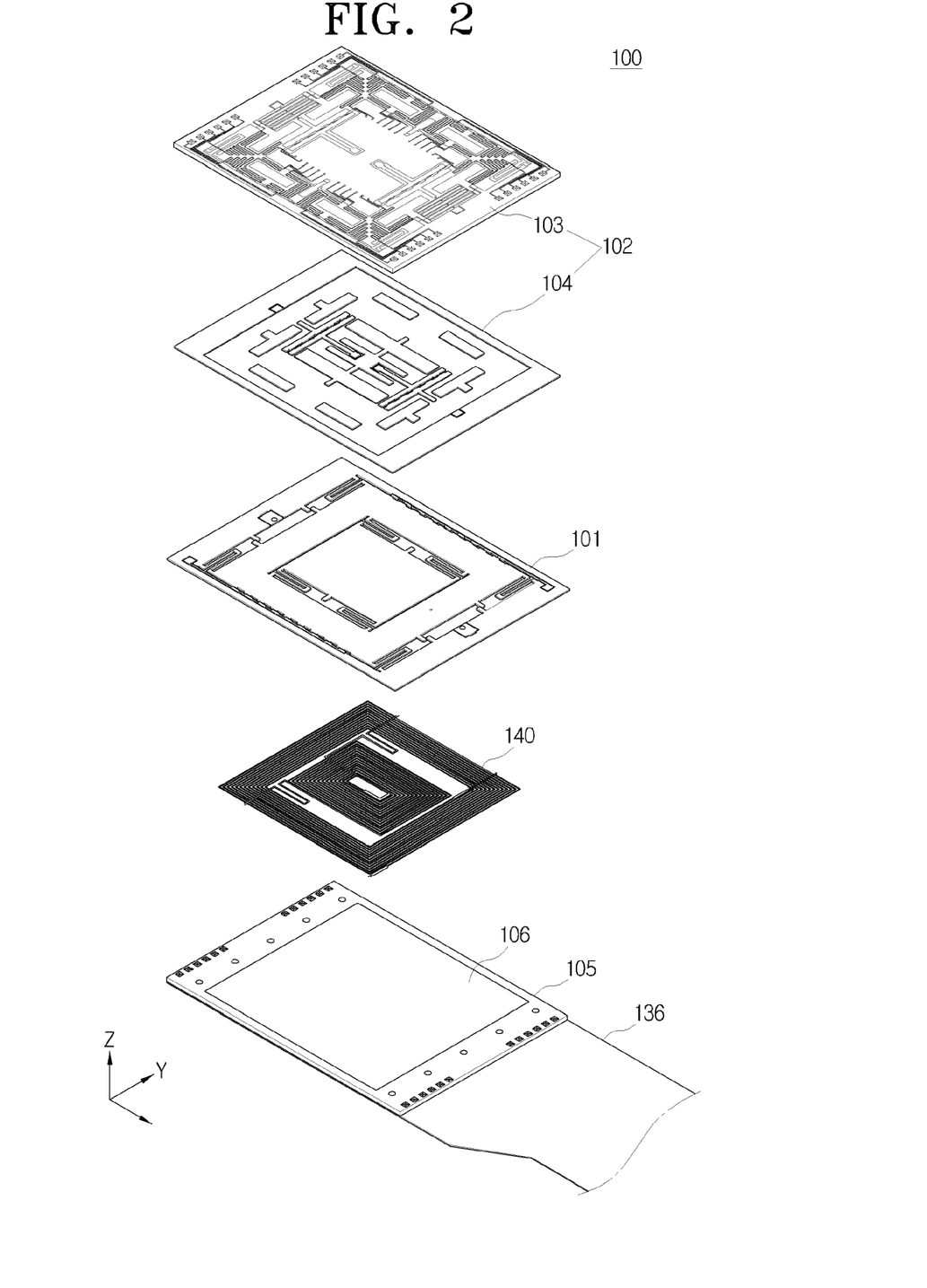
FIG. 2 illustrates an XY driving stage, showing the respective layers separately, according to an exemplary embodiment of the present invention.
Figure 3:
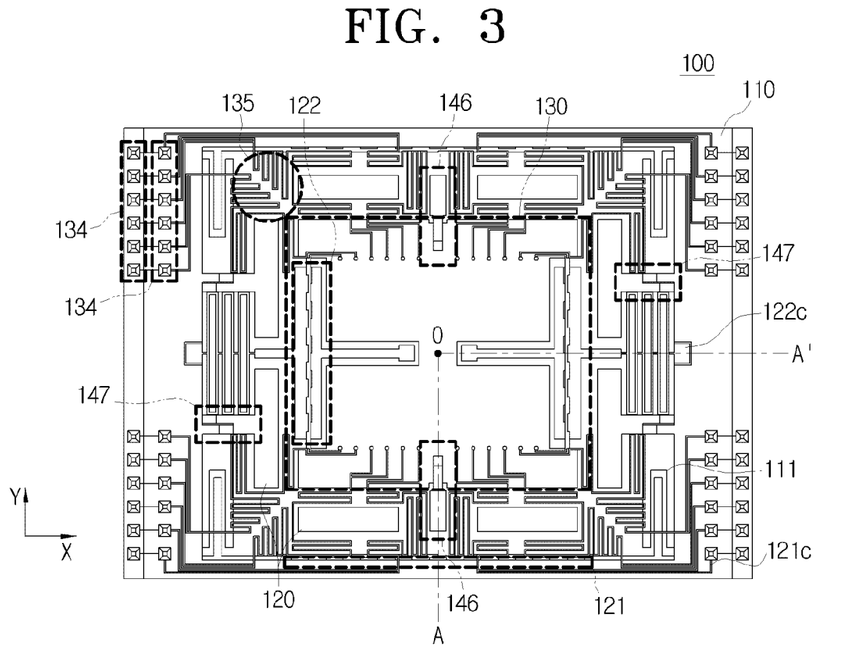
FIG. 3 illustrates an XY driving stage, showing the respective layers of FIG. 2 integrated, according to an exemplary embodiment of the present invention.

FIG. 2 illustrates the XY driving stage 100, showing the respective layers separately, according to an exemplary embodiment of the present invention, and FIG. 3 illustrates the XY driving stage 100, showing the respective layers of FIG. 2 integrated, according to an exemplary embodiment of the present invention.

Referring to FIGS. 2 and 3, the XY driving stage 100 according to an exemplary embodiment of the present invention includes a fixed substrate 110, a first driving unit 120, a second driving unit 130, a coil unit 140, a first spring unit 111, and a second spring unit 112.

The XY driving stage 100 is a three-layered wafer, which includes a first wafer 101, a second wafer 102, and a third wafer 105. The XY driving stage 100 may be fabricated by MEMS technology.

The method for fabricating the XY driving stage 100 is explained below with reference to FIG. 2.

First, an insulating layer of a predetermined pattern is formed on one side of the first wafer 101 or the second wafer 102.

The first and second wafers 101 and 102 are then bonded to each other, with the insulating layer being interposed therebetween. Prior to the wafer bonding, a predetermined pattern may be formed on a predetermined unit of the second wafer 102 by etching. The above etching process may use generally known methods such as wet etching, dry etching, or the like. The second wafer 102 after etching may be classified into a second wafer bottom 104 and a second wafer top 103. The second wafer bottom 104 corresponds to the lower portion of the etched second wafer 102, and the second wafer top 103 corresponds to the upper portion of the second wafer bottom 104. Although FIG. 2 illustrates the second wafer top 103 and the second wafer bottom 104 as the separate layers of wafers for convenience of illustration, these are parts of a single wafer.

After the wafer bonding, the lower portion of the first wafer 101 is trenched, to form the coil unit 140. The configuration and function of the coil unit 140 will be explained below.

The second wafer 102 is then etched to form a pattern of the first and second driving units 120 and 130. The first driving unit 120 has a cavity formed therein in a predetermined configuration. At a later stage, the second driving unit 130 is placed in the cavity, and may be connected to the first driving unit 120 via a spring. A wiring may additionally be patterned on the second wafer top 103 to be connected to the photographing unit 300 which will be mounted at a later stage.

The third wafer 105 is also etched to form a groove area 106 on one side. The groove area 106 provides a space to allow the first and second driving units 120 and 130, which will be formed later, to be moved therein.

The first and second wafers 101 and 102 are then bonded to each other in the direction of surface of the third wafer 105 in which the groove area 106 is formed. Accordingly, as the first and second driving units 120 and 130 are arranged in the groove area 106, a space capable of displacement, is ensured. The third wafer 105 may be implemented using a printed circuit board (PCB). Alternatively, a glass sub wafer may be implemented for increased physical characteristic and structural stability.

FIG. 3 illustrates the structure of the XY driving stage 100 which is fabricated as explained above.

Referring to FIG. 3, the fixed substrate 110 is formed of the outer portions of the first, second and third wafers 101, 102 and 105. The fixed substrate 110 has the groove area 106 formed therein for the efficient operation of the first and second driving units 120 and 130, and may be connected to the first driving unit 120 via the first spring unit 111. Specifically, the fixed substrate 110 and the first driving unit 120 may be connected to each other via the first spring unit 111 provided on the left and right side of the X axis, and so are capable of moving in the X direction.

The fixed substrate 110 includes an output port for an input and output electrode wiring of the photographing unit 300. Various signals, such as signals of the input and output electrode wiring of the photographing unit 300, or the control signals of the XY driving stage 100, are input and output through an electrode interface 136. The electrode interface 136 is electrically connected to the electrode wiring formed in the third wafer 105, and may be implemented as a flexible printed circuit (FPC). Specifically, the upper portion of the second wafer 102 and the third wafer 105 of the fixed substrate 110 may be wire-interconnected to each other, to electrically connect the electrode wiring on the upper portion of the fixed substrate 110 to the electrode interface 136 formed on the third wafer 105. Additionally, an electrode for signal input and output of the XY driving stage 100 may be formed on the lower portion of the first wafer 101 of the fixed substrate 110, and a via hole may be formed on the third wafer 105 at a location to correspond to the electrode. Accordingly, various signals of the XY driving stage 100 can be transmitted to the electrode interface 136.

The first driving unit 120 is formed of the first and second wafers 101 and 102, and is placed within the fixed substrate 110. Specifically, the first driving unit is connected to the fixed substrate 110 through the first spring unit 111, and is placed in the groove area 106 of the fixed substrate 110 at a predetermined distance apart from the surface of the fixed substrate 110 for a frictionless movement. The first driving unit 120 may have a cavity therein to connect to the second driving unit 130.

The first driving unit 120 may include a first coil 141 formed at a lower portion. The first driving unit 120 is moved in the X direction by the interaction of an electromagnetic force with the magnetic force of the magnet unit 150, as the electric current is applied to the first coil 141 formed at the lower portion.

The second driving unit 130 includes the first and second wafers 101 and 102, and is placed within the first driving unit 120. Specifically, the second driving unit 130 is arranged in the cavity of the first driving unit 120 and connected to the first driving unit via the second spring unit 112. The second driving unit 130 is arranged in the groove area 106 of the fixed substrate 110, at a predetermined distance apart from the surface of the fixed substrate 110 for a frictionless movement.

The second driving unit 130 may include a second coil 142 formed at a lower portion. Accordingly, the second driving unit 130 is moved in the Y direction by the interaction of the electromagnetic force with the magnetic force of the magnet unit 150, as an electric current is applied to the second coil 142 formed at the lower portion of the second driving unit 130.

The second driving unit 130, being connected to the first driving unit 120, is moved in the X direction in accordance with the first driving unit 120, and is also capable of moving in Y direction independently. Accordingly, the second driving unit 130 is capable of two axis displacement in X and Y directions.

The coil unit 140 is placed within the lower portion of the first wafer 101 and generates an electromagnetic force when the electric current is applied. The coil unit 140 will be explained below with reference to FIG. 4.

Figure 4:
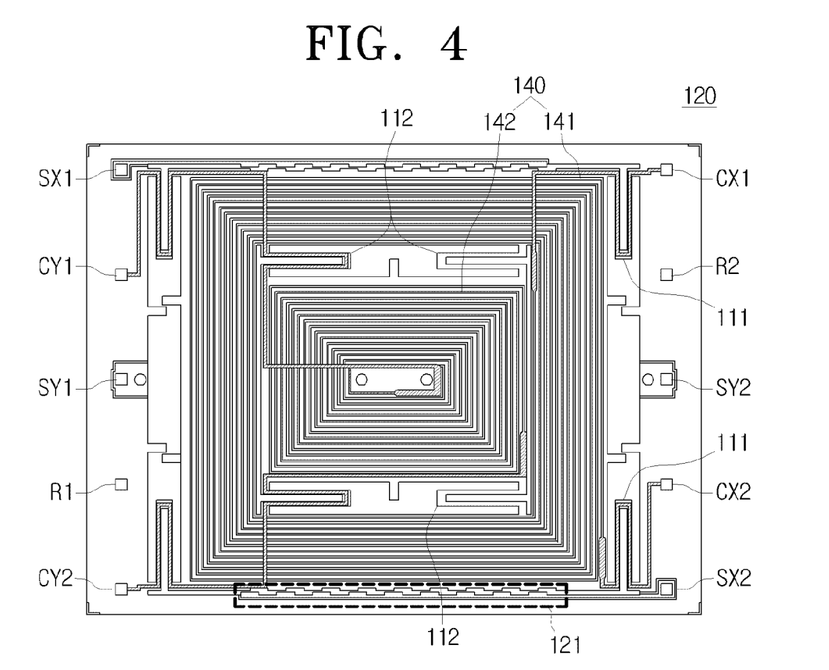
FIG. 4 is a bottom view of the first wafer 101 of FIG. 2.

FIG. 4 illustrates the lower portion of the first wafer 101 of FIG. 2.

Referring to FIG. 4, the first coil 141 is formed at a lower portion of the first wafer 101. Specifically, the first coil 141 in spiral pattern is formed at a lower portion of the first wafer 101 that corresponds to the first driving unit 110, and the second coil 142 also in spiral pattern is formed at a lower portion of the first wafer 101 that corresponds to the second driving unit 120. The first and second coils 141 and 142 are formed at the lower portion of the first wafer 101 by trenching. Although the first and second coils 141 and 142 according to the above exemplary embodiments of the present invention are formed in a counterclockwise spiral pattern when viewed from the bottom of the first wafer 101, the coils 141 and 142 may be formed in a clockwise spiral pattern.

As explained above, the electrodes CX1, CX2, CY1, CY2, SX1, SX2, SY1, SY2, R1 and R2 are formed at the lower portion of the first wafer 101 to output various signals of the XY driving stage 100, and are electrically connected to the electrode interface 136 through a via hole formed in the third wafer 105.

The magnet unit 150 is arranged on the fixed substrate 110 opposite to the coil unit 140, and may include a pair of permanent magnets having opposite directions of magnetization. The magnet unit 150 will be explained below with reference to FIG. 5.

Figure 5:
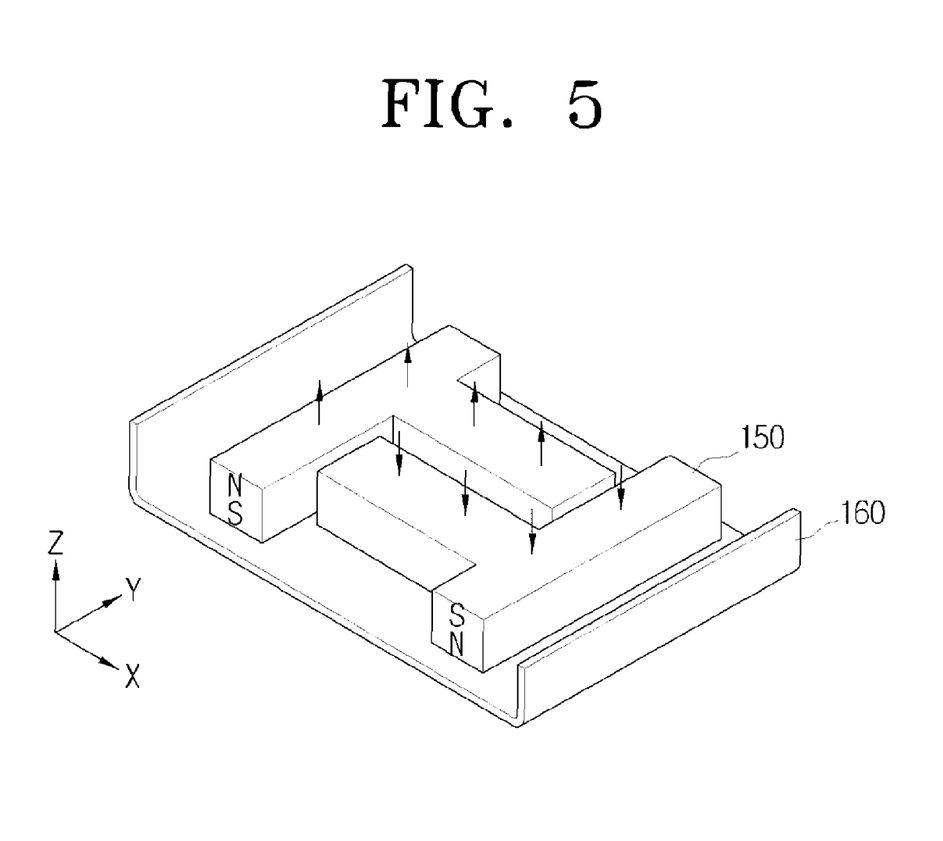
FIG. 5 illustrates a magnetic unit and a yoke according to an exemplary embodiment of the present invention.

FIG. 5 illustrates the magnet unit 150 and the yoke 160 according to an exemplary embodiment of the present invention.

Referring to FIG. 5, the magnet unit 150 includes a pair of permanent magnets provided in an arrangement in which the protruding portions of the permanent magnets face each other. Each of the permanent magnets may be provided in a T-shaped configuration and the permanent magnets have a magnetic force of Z axis orientation. The magnet unit 150 may alternatively be implemented as a plurality of permanent magnets or electromagnets.

The permanent magnets may desirably have opposite directions of magnetization. Specifically, the directions of magnetization influence the directions of the Lorentz forces, and in a case where the coils are provided in a spiral pattern, the Lorentz forces are counterbalanced if the same electromagnetic force applies the entire part of the coils. However, if the coils have opposite directions of magnetization, the Lorentz forces are not counterbalanced, but have a predetermined orientation. Since the permanent magnets are arranged at an area to generate a Lorentz force in X direction, instead of being arranged at a lower portion of the first driving unit 120 to generate a Lorentz force in Y direction, magnetic force is supplied to the first driving unit 120 efficiently.

The yoke 160 may be implemented to surround the magnet unit 150 to form a ferromagnetic shielding structure. Specifically, the yoke 160 is bonded to the lower sides of the permanent magnets, to reduce magnetic resistance of the magnetic flux generated from the permanent magnets and to increase the magnitude of the magnetic force being supplied to the coil unit 140 to generate electromagnetic force, so that the magnetic force of the permanent magnets can be applied efficiently. Since the yoke 160 has the ferromagnetic shielding structure to block the magnetic field from leaking out, the neighboring circuit components formed around the permanent magnets are protected from the influence. The yoke 160 may desirably be made from a metal material of high magnetic permeability.

Figure 6:
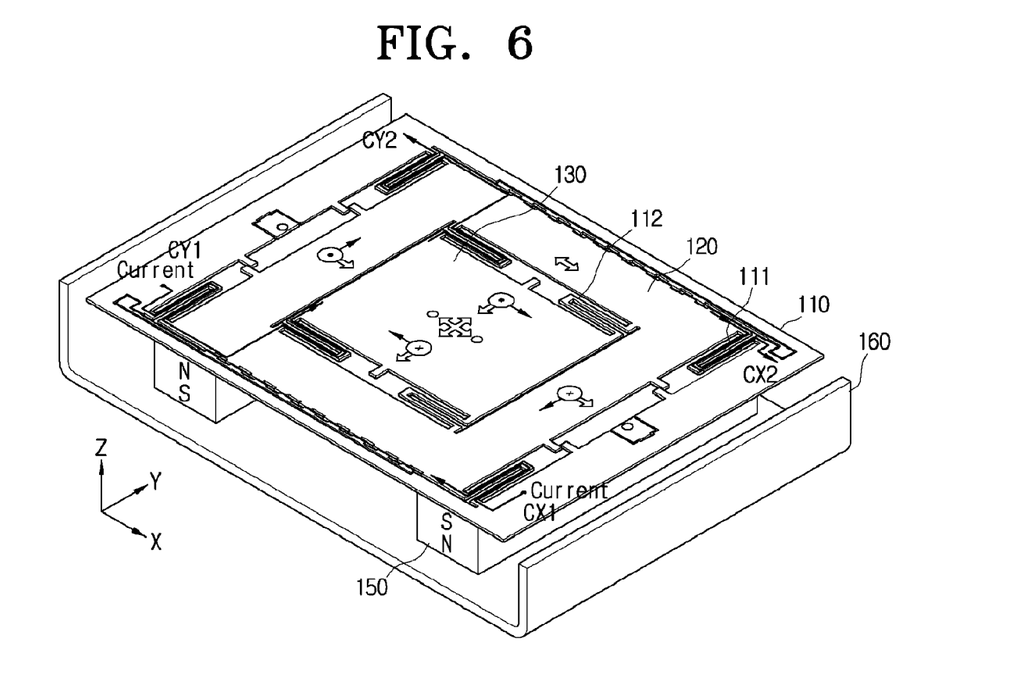
FIG. 6 is a top view of a first wafer to explain the operation of a driving system according to an exemplary embodiment of the present invention.

FIG. 6 illustrates the upper portion of the first wafer 101 of FIG. 2, to explain the operation of the driving system 200 according to an exemplary embodiment of the present invention.

Referring to FIG. 6, a magnetic force in Z direction is formed left side of the first driving unit 120, and a magnetic force in −Z direction is formed right side of the first driving unit 120. If electric current is applied through the electrode CX1 to the first driving unit 120 in which the magnetic force is formed, the electric current flows the first coil 141 in clockwise direction when viewed from the upper portion of the first wafer 101. Accordingly, the electromagnetic force of the current flowing Y direction interacts with the magnetic force in Z direction, forming a Lorentz force in X direction on the left side of the first driving unit 120. On the right side of the first driving unit 120, a Lorentz force in X direction is also generated as the electromagnetic force in −Z direction interacts with the magnetic force in −Z direction. As a result, the first driving unit 120 is moved in X direction. If electric current is applied through the electrode CX2, that is, in opposite direction, the electric current flows counterclockwise while the direction of the magnetic force remains unchanged. As a result, the Lorentz force in −X direction is generated.

The second coil 142 operates in a similar manner as the first coil 141 so that the electric current flows the second coil 142 clockwise if the electric current is applied through the electrode CY1. In this case, a Lorentz force in -Y direction is formed on the upper portion of the second driving unit 130, as the electromagnetic force of the electric current flowing in X direction interacts with the magnetic force in Z direction. A Lorentz force in -Y direction is formed on the lower portion of the second driving unit 130, by the interaction between the electromagnetic force of the electric current flowing in -X direction and the magnetic force in -Z direction. As a result, the second driving unit 130 is moved in Y direction. If electric current is applied through the electrode CY2, that is, in opposite direction, the electric current flows the second coil 142 in counterclockwise direction, while the direction of the magnetic force remains unchanged. As a result, the second driving unit 130 is moved in Y direction by the Lorentz force in Y direction.

Accordingly, the driving system according to the exemplary embodiments of the present invention is capable of moving the position of the photographing element in two directions X and Y perpendicular to each other. Since the displacement driving is performed by the magnetic force, abrasion of the contacting surfaces does not occur. Furthermore, since the driving system is fabricated by using MEMS technology, more compactness and preciseness are provided.

The photographing unit 300 may be formed on the upper portion of the displacement driving unit 200, to implement a hand tremor compensating apparatus as the one 1000 illustrated in FIG. 1. The hand tremor compensating apparatus 1000 may be applied to the devices such as cameras or camcorders.

The photographing unit 300 is mounted to the driving unit 200 to be moved and displaced in accordance with the displacements of a plurality of driving units. The photographing unit 300 converts a light entering a lens into an electric signal, and processes the electric signals. To this purpose, the photographing unit 300 may include pixels and an AD converter. The pixels output image signals in an analog form. The pixels of the photographing unit 300 may include a charge-coupled device (CCD) or a complementary metal oxide semiconductor (CMOS) optical sensor.

The hand tremor compensating apparatus 1000 drives the first and second driving units 120 and 130 in accordance with the hand tremor or shaking of the camera, to displace the photographing element. The driving system according to the exemplary embodiment of the present invention may be fabricated using MEMS technology to provide more compactness and preciseness. Since the hand tremor compensating apparatus is small sized, the hand tremor compensating apparatus is particularly efficient to apply in the device such as mobile phone or portable devices.

Meanwhile, since a conventional driving system does not have a detecting device therein, it is difficult to fabricate the driving system in small size. Furthermore, size increases due to the requirement for the spaces for coils for two-axis driving, magnets, and the stage.

However, the hand tremor compensating apparatus 1000 according to an exemplary embodiment of the present invention houses a detecting unit therein. The structure of the detecting unit 120 will be explained below with reference to FIGS. 3, 4, 7 and 8.

Referring to FIG. 3, the hand tremor compensating unit 1000 includes a first detecting unit 121 and a second detecting unit 122 formed in the XY driving stage 100 to detect the displacements in X and Y directions.

The first detecting unit 121 is formed to face the fixed substrate 110 and the first driving unit 120 to measure the displacement of the first driving unit 120. Specifically, the first detecting unit 121 includes a plurality of electrodes, to measure the capacitance among the electrodes and measure the X direction displacement based on the measurement. Although two electrode areas are provided on the left and right sides of the Y axis according to an exemplary embodiment of the present invention, other examples are also possible. For example, the electrodes may be formed on either the right or left side of the Y axis to detect the displacement. The structure and operation of the first detecting unit 121 will be explained below with reference to FIG. 8.

Figure 8:
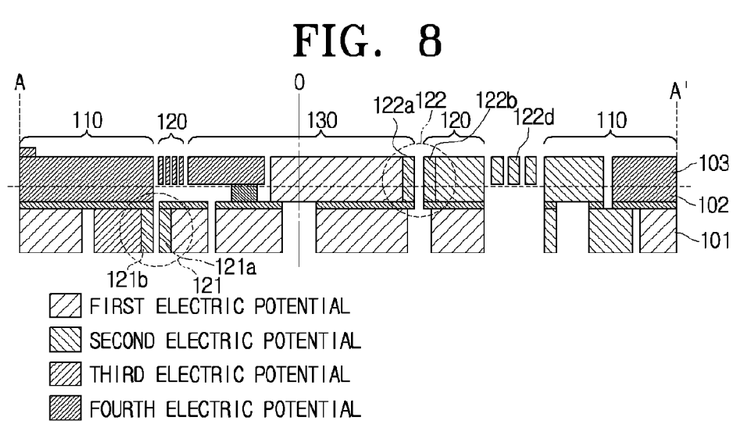
FIG. 8 illustrates an XY driving stage, partially in cross-section, to explain the operation of a detecting unit according to an exemplary embodiment of the present invention.

FIG. 8 illustrates an XY driving stage, in a partially cross-section, to explain the operation of the detecting unit according to an exemplary embodiment of the present invention.

Referring to FIG. 8, the first detecting unit 121 may include a first detecting electrode 121a formed on the outer area of the first driving substrate 120 of the first wafer 101, to measure the X-direction displacement of the first driving unit 120, and may include a second detecting electrode 121b formed on a portion of the fixed substrate 110 of the first wafer 101, opposite to the first detecting electrode 121a. The first and second detecting electrodes 121a and 121b may be implemented as the electrodes having a plurality of protrusions.

Referring to FIGS. 3 and 8, the first detecting unit 121 is operated in a manner so that the first detecting electrode 121a is moved in accordance with the X-direction displacement of the first driving unit 120 to be moved in X direction. The second detecting electrode 121b, being formed on the fixed substrate 110, does not move. If the first detecting electrode 121a is moved in accordance with the first driving unit 120, the first and second detecting electrodes 121a and 121b face the changed areas, so that the capacitance between the first and second detecting electrodes 121a and 121b varies. Accordingly, the displacement in X direction of the XY driving stage 100 can be measured by measuring the electric potential between the first and second detecting electrodes 121a and 121b.

Meanwhile, the electric potentially applied to the entire part of the XY driving stage 100 may also be supplied to the first detecting electrode 121a. In this case, a separate wiring to measure the electric potential of the first detecting electrode 121a can be omitted, so that simpler design of the XY driving stage 100 is possible.

Referring to FIG. 4, the electric potential of the second detecting electrode 121b can be measured through a first electrode output unit 121c. The second detecting electrode 121b and the first electrode output unit 121c are formed within the fixed substrate 110 in a structurally and electrically separate manner. Specifically, the first electrode output unit 121 connects the second detecting electrode 121b and the electrodes SX1 and SX2 formed on the first wafer 101. The electrodes SX1 and SX2 are electrically connected to the electrode interface 136 through a via hole formed in the third wafer 105. Therefore, no additional components are necessary.

The second detecting unit 122 is formed to face the first and second driving units 120 and 130 to measure the Y-direction displacement of the second driving unit 130. Specifically, the second detecting unit 122 includes a plurality of electrodes to measure the capacitance among the plurality of electrodes, and to measure the X-direction displacement. Although two electrode areas are provided on the left and right sides of the X axis according to an exemplary embodiment of the present invention, other examples are also possible. For example, the electrodes may be formed on either the right or left side of the X axis to detect the displacement. The structure and operation of the second detecting unit 122 will be explained below with reference to FIGS. 7 and 8.

Figure 7:
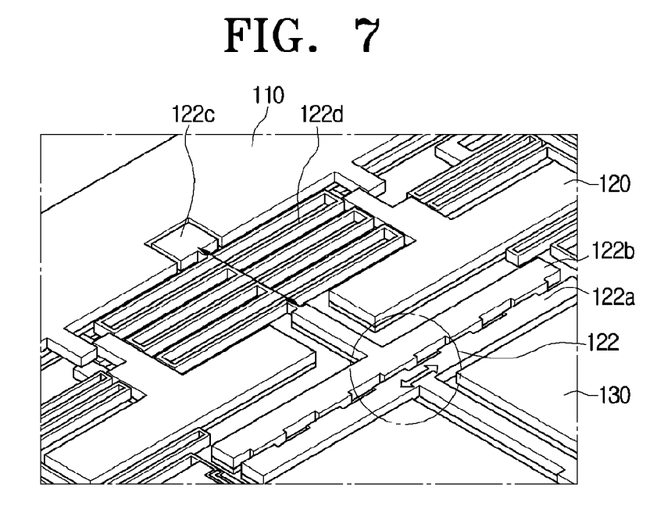
FIG. 7 is a top perspective view of an XY driving stage to explain the operation of a detecting unit according to an exemplary embodiment of the present invention.

FIG. 7 is a top perspective view of the XY driving stage, to explain the operation of the second detecting unit 122 according to an exemplary embodiment of the present invention.

Referring to FIGS. 7 and 8, the second detecting unit 122 includes a third detecting electrode 122a formed on an outer surface of the second upper structure layer formed on an upper portion of the second driving unit 130, and a fourth detecting electrode 122b formed on the first upper structure layer formed on an upper portion of the first driving unit 120. Each of the third and fourth detecting electrodes 122a and 122b may have a plurality of protrusions.

Referring to FIGS. 3 and 8, the operation of the second detecting unit 122 will be explained below.

First, if the second driving unit 130 is moved in Y direction, the third detecting electrode 122a placed in the area of the second driving unit 130 of the second wafer 102 is moved in Y direction accordingly. The fourth detecting electrode 122b is placed in the area of the first driving unit 120 in the second wafer 102, and so does not move in the Y direction. As the third detecting electrode 122a is moved in accordance with the second driving unit 130, the third and fourth detecting electrodes 122a and 122b face changed areas, so that the capacitance between the third and fourth detecting electrodes 122a and 122b varies. Accordingly, the displacement of the XY driving stage 100 in the Y direction can be measured, by measuring the electric potential between the third and fourth detecting electrodes 122a and 122b.

Meanwhile, the electric potential supplied to the entire part of the XY driving stage 100 may also be supplied to the third detecting electrode 122a. In this case, a separate wiring to measure the electric potential of the third detecting electrode 122a is unnecessary, so simpler design of the XY driving stage 100 is possible.

Referring to FIG. 4, the electric potential of the fourth detecting electrode 122b may be measured through the second electrode output unit 122c. The fourth detecting electrode 122b and the second electrode output unit 122c are formed inside the fixed substrate 110 and the first driving unit 120 separately from each other, both structurally and electrically.

Specifically, the second electrode output unit 122c is electrically connected to the fixed substrate 110 through the first driving unit 120 on the second wafer 102 and through an elastic connector 122d connecting the fixed substrate 110. The electric wiring connected through the elastic connector 122d is connected to the electrodes SY1 and SY2 formed on the first wafer 101. The electrodes SX1 and SX2 are electrically connected to the electrode interface 136 through a via hole formed in the third wafer 105. The XY driving stage 100 may be allowed to drive more efficiently, by forming the elastic connector 122d in a thickness smaller than that of the first driving unit 110 of the second wafer 102.

As a result, a capacitor-type two axis detecting unit may be implemented on the XY driving stage 100, without requiring a separate, additional component, or increasing the size of the product, and the XY driving stage 100 can be small-sized.

Meanwhile, a conventional driving system has no structure to resist against shock or impact, and thus is frequently damaged.

According to an exemplary embodiment of the present invention, the XY driving stage 100 may include a stopper to provide endurance against the impact exerting on the MEMS structure. This will be explained in detail below with reference to FIGS. 9A, 9B, 10A and 10B.

Figure 9A:
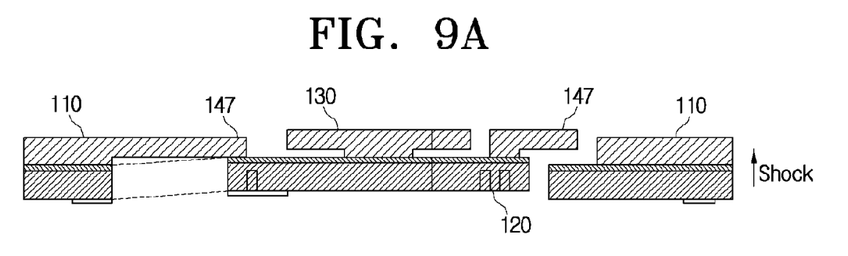
FIGS. 9A and 9B illustrate the operation of a stopper according to an exemplary embodiment of the present invention.
Figure 9B:
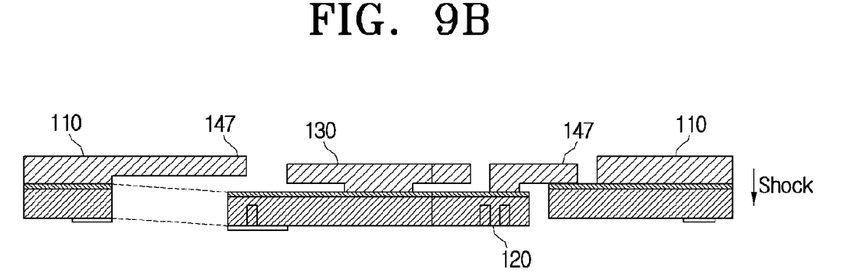
Figure 10A:
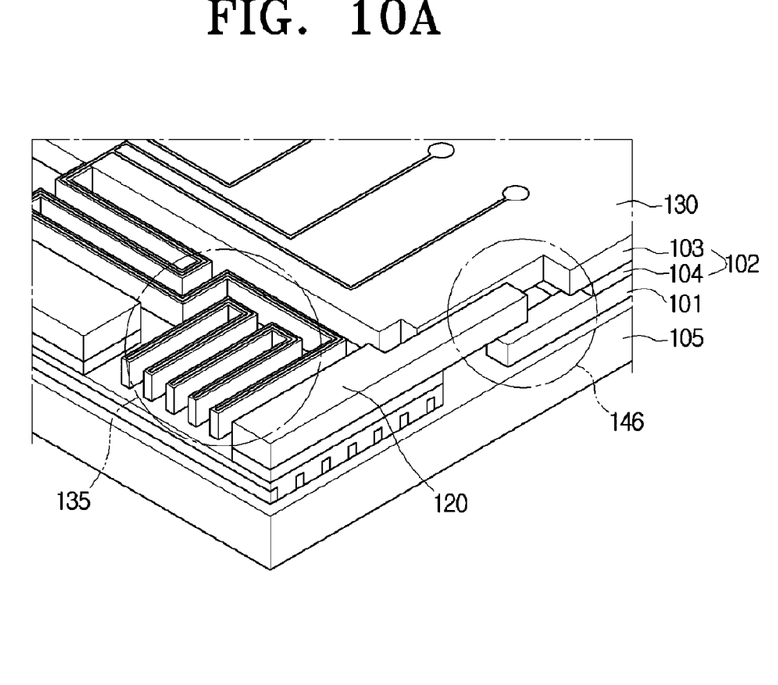
FIGS. 10A and 10B are top perspective views of an XY driving stage, to illustrate a stopper according to an exemplary embodiment of the present invention.
Figure 10B:
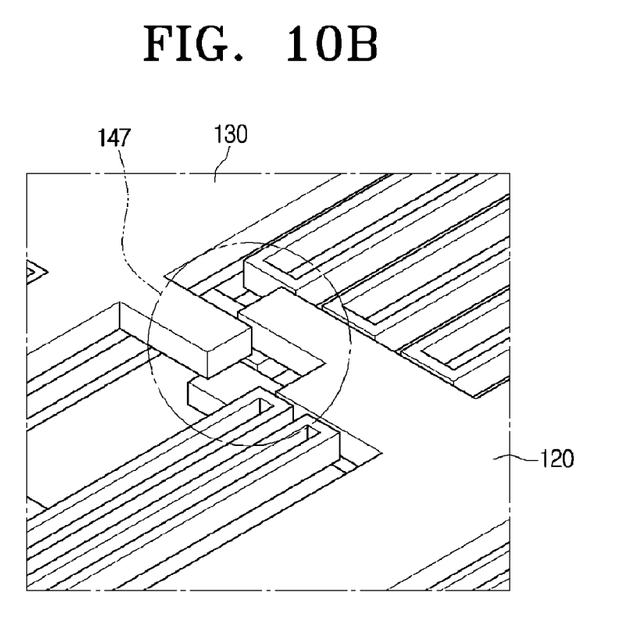

FIGS. 9A and 9B illustrate the operation of the stoppers 146 and 147 according to an exemplary embodiment of the present invention, and FIGS. 10A and 10B illustrates the XY driving stage 100, in a partial cross-section, to illustrate the stoppers 146 and 147 according to an exemplary embodiment of the present invention.

Referring to FIGS. 9A, 9B, 10A and 10B, the stoppers 146 and 147 restrict at least one of the first and second driving units 120 and 130 from moving in a perpendicular relation with respect to the surface of the fixed substrate 110. Specifically, the first and second driving units 120 and 130 operate along the groove area 106 in order to avoid physical friction. A displacement in Z direction due to average level of hand tremor does not affect the MEMS structure. However, the movement in Z direction due to an excessive impact can cause the first and second spring units 111 and 112 connecting the first and second driving units 110 and 120 to be damaged.

The first stopper 146 faces the first and second driving units 120 and 130, to restrict the second driving unit 120 from moving excessively in Z direction. Referring to FIG. 10A, the second wafer top 103 of the first stopper 146, formed in the area of the first driving unit 120, protrudes further than the first wafer 101 formed in the area of the second driving unit 130, to restrict the movement in Z direction. The first stopper 146 may be formed on one side of the XY driving stage 100, or alternatively, a pair of first stoppers 146 may be provided.

The second stopper 147 faces the fixed substrate 110 and the first driving unit 120, to restrict the first driving unit 120 from moving in Z direction. Referring to FIG. 10B, the second wafer top 103 of the second stopper 147, which is formed in the area of the fixed substrate 110, protrudes further from the first wafer 101 formed in the area of the first driving unit 120, to restrict the movement in Z direction. The second stopper 147 may be formed on one side of the XY driving stage 100, or alternatively, a pair of second stoppers 147 may be provided. Referring to FIGS. 9A and 9B, when the external impact is exerted in −Z direction, the second stopper 147 restricts the movement in −Z direction, and when the external impact is exerted in Z direction, the second stopper 147 restricts the movement in Z direction.

Therefore, the hand tremor compensating apparatus 1000 according to the exemplary embodiment of the present invention provides improved resistance against impact, due to the stoppers 146 and 147 provided on the XY driving stage 100.

Meanwhile, the conventional driving system has no wiring portion therein, requiring the wirings for the input and output electrodes of the photographing element to be extended directly to the outside. Accordingly, the weight of the additional electrode wiring is added, and the operation of the driving unit is limited due to its connection to the wirings.

The XY driving stage 100 according to an exemplary embodiment of the present invention includes a wiring portion 134 to resolve the above problems occurring in the conventional art.

The wiring portion 134 connects the input and output electrode wirings of the photographing unit 300 to the upper portion of the fixed substrate 110. The input and output electrode wirings of the photographing unit 300 are input through the upper portion of the second driving unit 130, and electrically connected to the fixed substrate through the wiring spring unit 135 which connects the second driving unit 130 and the fixed substrate 110. Specifically, the wiring spring unit 135 connects the fixed substrate 110 and the second driving unit 130, and the wiring formed on the upper portion of the wiring spring unit 135 electrically connects the input and output signals of the photographing unit 300 to the fixed substrate 110. The wiring connected to the upper portion of the second wafer 102 of the fixed substrate 110 may be electrically connected to the interface 136 of the third wafer 105 by wire interconnection. The wiring may also be electrically connected to the interface 136 through a via hole extended through the first, second and third wafers 101, 102 and 105. Accordingly, only the photographing unit 300 is connected to the stage layer, and the signal is input or output from the photographing unit 300 without being influenced by the XY movement.

While certain exemplary embodiments of the present invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A driving system comprising:
   a fixed substrate;
   a coil unit which generates an electromagnetic force if an electric current applied;
   a magnet unit formed under the fixed substrate to face the coil unit; and
   a plurality of driving units which are interconnected with each other on the fixed substrate, and which are moved respectively in parallel direction with respect to a surface of the fixed substrate in accordance with an interaction between the electromagnetic force and a magnetic force of the magnet unit, if the electric current is applied,
   wherein the plurality of driving units comprise:
   a first driving unit movable in a first direction which is parallel to the surface of the fixed substrate; and
   a second driving unit connected to the first driving unit to be moved in accordance with the movement of the first driving unit, the second driving unit movable in a second direction which is parallel to the surface of the fixed substrate and perpendicular to the first direction,
   wherein the driving system further comprises:
   a first spring unit to connect the first driving unit and the fixed substrate; and
   a second spring unit to connect the first and second driving units with each other.

2. The driving system of claim 1, wherein
   the fixed substrate comprises a groove area formed therein,
   the first driving unit is arranged in the groove area, at a predetermined distance apart from the surface of the fixed substrate, the first driving unit having a cavity formed therein, and
   the second driving unit is arranged in an area of the cavity of the first driving unit.

3. The driving system of claim 1, wherein the coil unit comprises;
   a first coil formed in the first driving unit; and
   a second coil formed in the second driving unit.

4. The driving system of claim 3, wherein the magnet unit comprises a pair of permanent magnets for driving, which face the first and second coils respectively and which have opposite directions of magnetization.

5. The driving system of claim 4, wherein the permanent magnets for driving each comprise a protruding area, and are arranged so that the protruding areas thereof face each other.

6. The driving system of claim 1, further comprising a yoke to surround the magnet unit so that a ferromagnetic shielding structure is provided.

7. The driving system of claim 1, further comprising:
   a stopper to restrict at least one of the first and second driving units from moving in a perpendicular relation with respect to the surface of the fixed substrate.

8. A driving system comprising:
   a fixed substrate;
   a coil unit which generates an electromagnetic force if an electric current applied;
   a magnet unit formed under the fixed substrate to face the coil unit; and
   a plurality of driving units which are interconnected with each other on the fixed substrate, and which are moved respectively in parallel direction with respect to a surface of the fixed substrate in accordance with an interaction between the electromagnetic force and a magnetic force of the magnet unit, if the electric current is applied,
   wherein the plurality of driving units comprise:
   a first driving unit movable in a first direction which is parallel to the surface of the fixed substrate; and
   a second driving unit connected to the first driving unit to be moved in accordance with the movement of the first driving unit, the second driving unit movable in a second direction which is parallel to the surface of the fixed substrate and perpendicular to the first direction,
   wherein the driving system further comprises:
   a first detecting unit which faces the fixed substrate and the first driving unit to measure a displacement of the first driving unit; and
   a second detecting unit which faces the first driving unit and the second driving unit to measure a displacement of the second driving unit.

9. The driving system of claim 8, wherein the first and second detecting units each comprise a plurality of electrodes, to measure displacement using a variation of capacitance between the electrodes.

10. The driving system of claim 8, wherein the first detecting unit comprises:
    a first detecting electrode connected to the first driving unit;
    a second detecting electrode connected to the fixed substrate; and
    a first electrode output unit connected to the second detecting electrode to output an electric potential of the second detecting electrode.

11. The driving system of claim 10, wherein the second detecting electrode and the first electrode output unit are formed in the fixed substrate separately from each other, structurally and electrically.

12. The driving system of claim 10, wherein the plurality of driving units further comprise:
    a first upper structure layer which is formed on an upper portion of the first driving unit, and which is electrically separated from the first detecting electrode; and
    a second upper structure layer which is formed on an upper portion of the second driving unit, and which is electrically connected to the first detecting electrode, and
    wherein the second detecting unit comprises,
    a third detecting electrode connected to the second upper structure layer,
    a fourth detecting electrode connected to the first upper structure layer, and
    a second electrode output unit connected to the fourth detecting electrode to output an electric potential of the fourth detecting electrode.

13. The driving system of claim 12, wherein the second electrode output unit is implemented as an elastic connector to connect the first upper structure layer and the fixed substrate.

14. The driving system of claim 13, wherein the elastic connector has a thickness so as not to exceed the thickness of the first upper structure layer.

15. The driving system of claim 12, wherein the first and second driving units are formed on a first wafer,
the first upper structure layer and the second upper structure layer are formed on the second wafer, and
the first and second wafers are bonded to each other, with having an insulating layer interposed therebetween.

16. A hand tremor compensating apparatus comprising:
a displacement driving unit comprising a plurality of driving units to move in designated directions due to an interaction between an electromagnetic force and a magnetic force, if an electric current is applied; and
a photographing unit mounted to the displacement driving unit to move in accordance with the movement of the plurality of driving units,
wherein the displacement driving unit comprises:
a fixed substrate;
a coil unit to generate an electromagnetic force, if an electric current is applied; and
a magnet unit formed under the fixed substrate to face the coil unit, and
wherein the plurality of driving units are interconnected with each other on the fixed substrate, and are moved respectively in parallel direction with respect to a surface of the fixed substrate in accordance with an interaction between the electromagnetic force and a magnetic force of the magnet unit, if the electric current is applied,
wherein the plurality of driving units comprise:
a first driving unit movable in a first direction which is parallel to the surface of the fixed substrate; and
a second driving unit connected to the first driving unit to be moved in accordance with the movement of the first driving unit, the second driving unit movable in a second direction which is parallel to the surface of the fixed substrate and perpendicular to the first direction,
wherein the displacement driving unit further comprises:
a first spring unit to connect the first driving unit and the fixed substrate; and
a second spring unit to connect the first and second driving units with each other.

17. The hand tremor compensating apparatus of claim 16, wherein
the fixed substrate comprises a groove area formed therein,
the first driving unit is arranged in the groove area, at a predetermined distance apart from the surface of the fixed substrate, the first driving unit having a cavity formed therein, and
the second driving unit is arranged in an area of the cavity of the first driving unit.

18. The hand tremor compensating apparatus of claim 16, wherein the coil unit comprises;
a first coil formed in the first driving unit; and
a second coil formed in the second driving unit.

19. The hand tremor compensating apparatus of claim 18, wherein the magnet unit comprises a pair of permanent magnets for driving, which face the first and second coils respectively and which have opposite directions of magnetization.

20. The hand tremor compensating apparatus of claim 19, wherein the permanent magnets for driving each comprise a protruding area, and are arranged so that the protruding areas thereof face each other.

21. The hand tremor compensating apparatus of claim 16, further comprising a yoke to surround the magnet unit so that a ferromagnetic shielding structure is provided.

22. The hand tremor compensating apparatus of claim 16, wherein
the displacement driving unit further comprises a stopper to restrict at least one of the first and second driving units from moving in a perpendicular relation with respect to the surface of the fixed substrate.

23. The hand tremor compensating apparatus of claim 16, further comprising a wiring portion to connect input and output electrode wirings of the photographing unit to the upper portion of the fixed substrate.

24. The hand tremor compensating apparatus of claim 23, wherein the wiring unit comprises a wiring spring unit to connect the fixed substrate to the second driving unit, and wherein a wiring is formed on an upper portion of the wiring spring unit.

25. A hand tremor compensating apparatus comprising:
a displacement driving unit comprising a plurality of driving units to move in designated directions due to an interaction between an electromagnetic force and a magnetic force, if an electric current is applied; and
a photographing unit mounted to the displacement driving unit to move in accordance with the movement of the plurality of driving units,
wherein the displacement driving unit comprises:
a fixed substrate;
a coil unit to generate an electromagnetic force, if an electric current is applied; and
a magnet unit formed under the fixed substrate to face the coil unit, and
wherein the plurality of driving units are interconnected with each other on the fixed substrate, and are moved respectively in parallel direction with respect to a surface of the fixed substrate in accordance with an interaction between the electromagnetic force and a magnetic force of the magnet unit, if the electric current is applied,
wherein the plurality of driving units comprise:
a first driving unit movable in a first direction which is parallel to the surface of the fixed substrate; and
a second driving unit connected to the first driving unit to be moved in accordance with the movement of the first driving unit, the second driving unit movable in a second direction which is parallel to the surface of the fixed substrate and perpendicular to the first direction,
wherein the displacement driving unit further comprises:
a first detecting unit which faces the fixed substrate and the first driving unit to measure a displacement of the first driving unit; and
a second detecting unit which faces the first driving unit and the second driving unit to measure a displacement of the second driving unit.

26. The hand tremor compensating apparatus of claim 25, wherein the first and second detecting units each comprise a plurality of electrodes, to measure displacement using a variation of capacitance between the electrodes.

27. The hand tremor compensating apparatus of claim 25, wherein the first detecting unit comprises:
a first detecting electrode connected to the first driving unit;
a second detecting electrode connected to the fixed substrate; and
a first electrode output unit connected to the second detecting electrode to output an electric potential of the second detecting electrode.

28. The hand tremor compensating apparatus of claim 27, wherein the second detecting electrode and the first electrode output unit are formed in the fixed substrate separately from each other, structurally and electrically.

29. The hand tremor compensating apparatus of claim 27, wherein the plurality of driving units further comprise:
 a first upper structure layer which is formed on an upper portion of the first driving unit, and which is electrically separated from the first detecting electrode; and
 a second upper structure layer which is formed on an upper portion of the second driving unit, and which is electrically connected to the first detecting electrode, and
 wherein the second detecting unit comprises,
  a third detecting electrode connected to the second upper structure layer,
  a fourth detecting electrode connected to the first upper structure layer, and
  a second electrode output unit connected to the fourth detecting electrode to output an electric potential of the fourth detecting electrode.

30. The hand tremor compensating apparatus of claim 29, wherein the second electrode output unit is implemented as an elastic connector to connect the first upper structure layer and the fixed substrate.

31. The hand tremor compensating apparatus of claim 30, wherein the elastic connector has a thickness so as not to exceed the thickness of the first upper structure layer.

32. The hand tremor compensating apparatus of claim 29, wherein the first and second driving units are formed on a first wafer,
 the first upper structure layer and the second upper structure layer are formed on the second wafer, and
 the first and second wafers are bonded to each other, with having an insulating layer interposed therebetween.

* * * * *